July 16, 1940.　　　A. J. FREEMAN　　　2,207,793
MARKING OF CASINGS
Filed Sept. 16, 1936　　　2 Sheets-Sheet 1
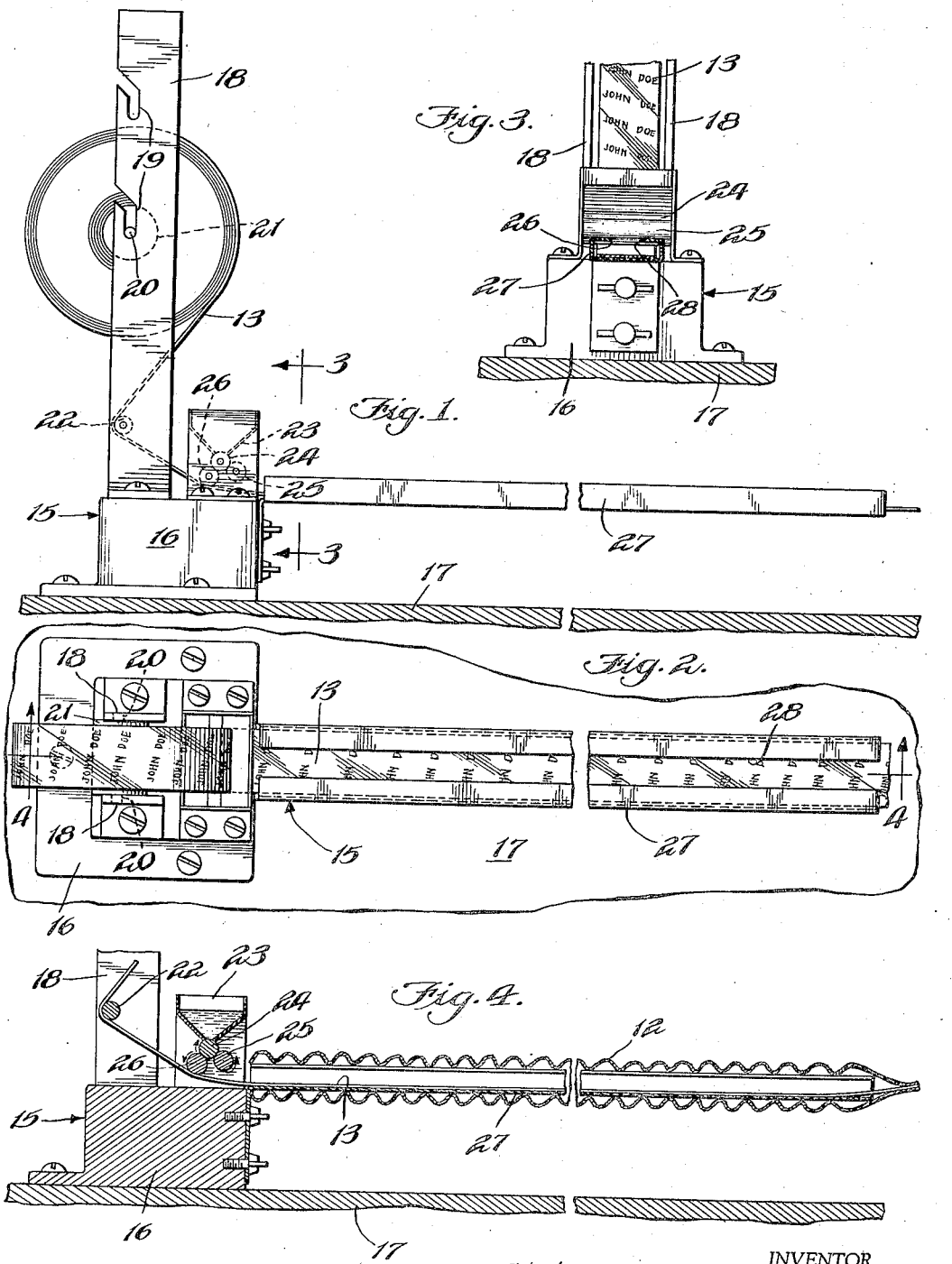
INVENTOR.
Alpheus J. Freeman
BY Glenn S. Noble
ATTORNEY.

July 16, 1940.     A. J. FREEMAN     2,207,793
MARKING OF CASINGS
Filed Sept. 16, 1936     2 Sheets-Sheet 2

INVENTOR.
Alpheus J. Freeman
BY Glenn S. Noble
ATTORNEY.

Patented July 16, 1940

2,207,793

UNITED STATES PATENT OFFICE 2,207,793

MARKING OF CASINGS

Alpheus J. Freeman, Chicago, Ill., assignor to Freeman, Incorporated, Chicago, Ill., a corporation of Illinois Application September 16, 1936, Serial No. 101,042

7 Claims. (Cl. 99—176)

This invention relates to the marking of casings or tubing or the kind used for food products such as sausages, meats or cheese, and which may be adapted for enclosing various other products or articles. It is particularly applicable to casings commonly known as "artificial" casings or tubings, such casings being commonly formed of transparent cellulose material of either vegetable or animal origin. Such artificial casings have heretofore been printed on the outside to indicate the source of manufacture or contents of the casing but such printing is difficult to perform and so expensive as to limit the use of casings of this kind and it is practically prohibitive to print the casings on more than one side. Furthermore the printing being on the exterior of the casing is apt to be affected, destroyed or mutilated during smoking, handling or various operations which further tends to prevent the successful use thereof. I have also found that the printing of the casings, which process requires drying of the ink, also tends to rapidly dry out or cause deterioration of such artificial casings which are usually made of cellulosic or synthetic material.

For use in connection with supplying food products to certain classes of trade, it may also be desirable to provide means for identifying the casings prior to their being stuffed. In other words the casings may be approved for use in certain particular factories for certain particular products and my improved laminated marking strip is particularly adapted for such use. For instance an approved number of markings may be applied to the strips and when the strips are laminated in the casings the casings will thus be identified so that the strip acts in the nature of a seal to guarantee the product placed in the casings.

In accordance with this invention I provide an improved casing with printed identifying strips therein and a novel method of forming the same, and also apparatus for the purpose of performing such operations. My invention also contemplates improvements which permit better tying of the ends of the casings or stapling thereof preparatory for the filling operation. While the invention is applicable for casings of various sizes it is particularly directed to relatively large casings of approximately two inches or more in diameter.

The objects of the invention as above indicated are to provide an improved casing with marking strips therein, and to provide a novel method of forming such casings I have also invented a machine or apparatus adapted for inserting and cementing or securing the strips in the casings. Other objects and advantages will appear more fully from the following description taken in connection with the accompanying drawings in which Figure 1 is a side view of the machine or apparatus used for carrying out my improved process and making the resulting articles;

Figure 2 is a plan view of the same;

Figure 3 is a sectional view taken on line 3—3 of Figure 1;

Figure 4 is a longitudinal sectional view taken on the line 4—4 of Figure 2;

Figure 5:
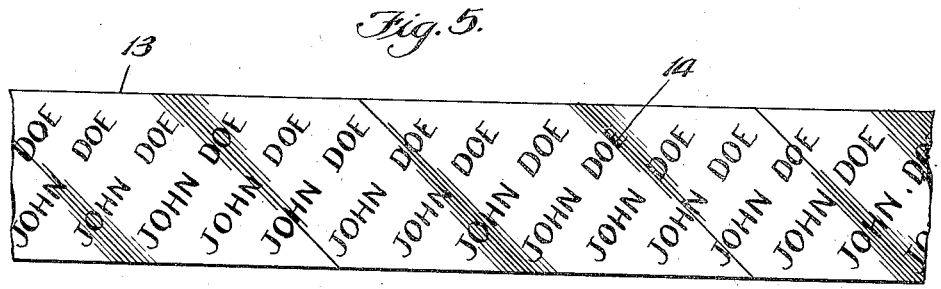
Figure 5 is a plan view of the marking strip.

As shown in these drawings, 12 indicates a casing or tubing such as ordinarily made by the extrusion or other well known process and which are transparent. These casings are usually made in continuous length and flattened and rolled into rolls of any desired size. In order to apply any desired trade name, trade-mark or other indicia to the casing I provide a strip or strips of suitable material such as cellulose, vegetable or animal parchment, "Cellophane," or the like, as shown at 13. These strips or bands may be either transparent, semi-transparent or opaque, as desired, and any printing or impressions may be made thereon as shown at 14. Such continuous printed labels or strips may be readily printed in one or more colors with any suitable ink, preferably of an edible character, and when printed in colors will greatly enhance the appearance of the sausage or other ingredients placed in the casings. Furthermore, as will presently be pointed out, these strips or bands, in addition to their marking or advertising characteristics, also serve to reinforce the casings and particularly the tied or closed ends thereof.

In order to apply the strips to the casings I provide a labeling or strip applying machine designated generally by the numeral 15. In the form shown this machine comprises a frame or base 16 which may be attached to a table 17 or other suitable support. The frame has two uprights 18 with slots 19 for receiving the spindle 20 of a roll 21 upon which the strip or band 13 is rolled. The strip 13 passes around the guide roller 22 through any suitable adhesive or cement applying device for applying adhesive thereto. This device comprises a fountain 23 with a slot at the bottom thereof through which the adhesive passes to a distributing roller 24 where it is spread by means of a spreading roller 25 and then passes to a third roller 26 which contacts with the upper surface of the strip as it passes thereunder. The adhesive may comprise any suitable glue, varnish, mucilage, paste or the like, and the applying means may be varied in order to apply the same. The strip then passes through a guide 27 which also serves to support the casing 12 which may be applied thereto in a substantially straight or flat condition or it may be shirred or ruffled as shown in Figure 4 so that the casing may be considerably longer than the guide. This guide is preferably made in the form of a flat or rectangular tube with a longitudinal slot or opening 28 in the top thereof through which the operator may extend a finger for drawing the strip through the guide.

Figure 6:
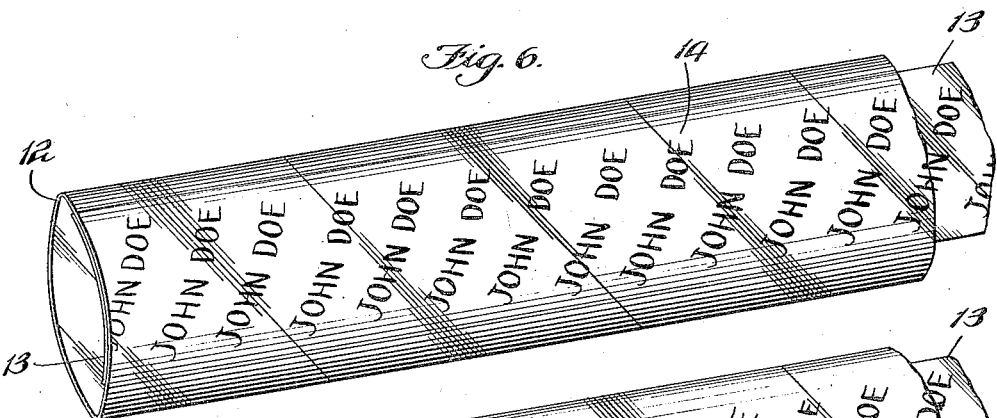
Figure 6 is a perspective view showing the tubular casing in flattened condition with one strip therein.

When the strip is to be applied to a tube or casing, the strip is drawn along underneath the adhesive applicator which applies adhesive to the upper surface thereof and the end is extended somewhat beyond the guide. The casing is then slipped over the guide as shown in Figure 4 and the operator pinches the end of the strip between the top and bottom layers of the casing and then draws the casing off or away from the guide, at the same time pulling the strip along so that when the casing passes from the guide it will have a strip 13 extending the entire length thereof with its upper surface coated or cemented to cause it to adhere to the adjacent inner surface of the tube or casing. The parts may be pressed together in any convenient manner as by drawing the casing along the top of the table with one hand pressing down on the same so that the top portion of the casing will be pressed evenly along on the marking strip, or any suitable mechanism may be provided for rolling or pressing these parts together. As the section of casing is withdrawn from the guide the strip is severed adjacent to the outer end of the guide preparatory for the next operation, these operations being quickly performed by those skilled in this line of work. After the strip has been applied to one side of the casing as shown in Figure 6, the operation may be repeated so as to apply a strip to the opposite side as shown in Figure 7, or any desired number of strips may be inserted although two will ordinarily be found sufficient.

It is the common practice to tie one end of a casing section while dry, that is, before the casing is soaked for filling purposes. With an ordinary artificial casing such tying is apt to cut or break the end so as the render the same defective. However, as shown in Figure 8, when the end of the casing is folded or fan-folded to form a cap such as shown at 29, the cord 30 will pass around the ends of the strip or strips in the casing and such strips will therefore tend to strengthen the ends or tied portions as well as the body of the casing.

Figure 8:
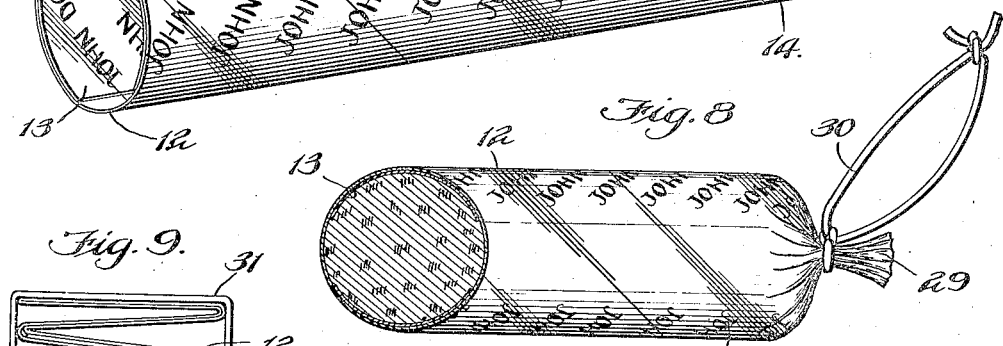
Figure 8 is a view showing the casing tied at one end.
Figures 9, 10:
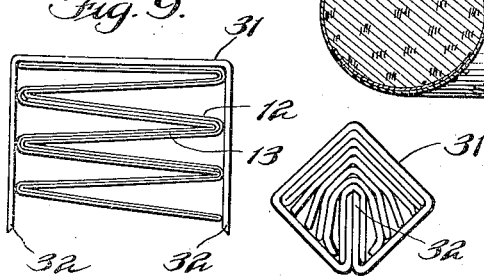
Figure 9 is a detail showing the casing with the end folded preparatory to stapling.
Figure 10 is an end view showing the stapled end.

On account of the frangible character of most cellulose or artificial casings it has been found impractical to staple the ends instead of tying the same as shown in Figure 8. However, when a casing is provided with my reinforcing strips the end may be folded or compressed as indicated in Figure 9 preparatory to being fastened by means of a staple 31. The staple is applied thereto by means of a suitable stapling machine and bent so that it assumes the form shown in Figure 10 with the cap or folded end closely compressed therein as indicated. The reinforcing strip or strips serve to prevent the ends 32 of the staple from puncturing or unduly cutting into the casing whereby a satisfactory closure may be made by using such staples.

Figure 7:
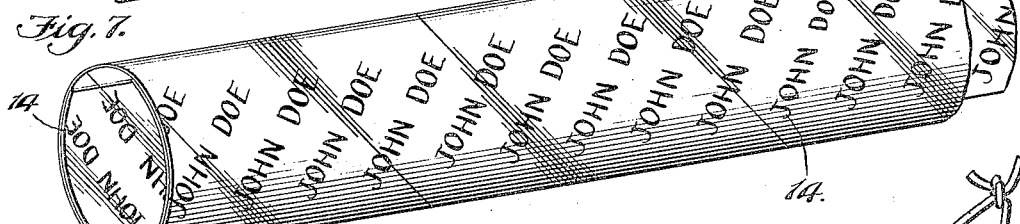
Figure 7 is a perspective view showing a casing with two strips therein.

When a casing is provided with two or more advertising or marking strips such as shown in Figure 7, the printing or marking thereon will be visible through the casing in substantially any position, either hanging or lying down, whereas if only one side of the casing is marked, such marking will not be visible unless turned toward the observer.

From this description it will be seen that I provide a novel advertising or marking system which serves to mark or identify the casings as well as the product placed therein and which will be of benefit to the manufacturers of sausage and other food products as it allows them to display their merchandise with trade-marks and brands in color schemes which are more attractive than when a single color is used in accordance with the present common practice. Furthermore my improved method provides means whereby it becomes practicable to supply casings in various sizes and lengths to the sausage manufacturer so that he may carry the same in stock and apply the marking strips thereto as desired for the trade. It will of course be obvious that the labels or marking being positioned within the casings are substantially permanent and cannot be affected by handling or the like.

While I have described a preferred embodiment of my invention and the method of performing same, it is apparent that changes may be made in various steps of the process, in the form of the article, and in the machine, without departing from the spirit thereof. Consequently I do not wish to be limited to the particular features herein disclosed except as specified in the following claims, in which I claim:

1. A flexible artificial casing formed of cellulose or the like for receiving food products to be stuffed therein, having a laminated strip provided with identifying indicia such as printing or marking and extending longitudinally thereof and cemented to the inner surface, said strip serving to identify the casing and also the product stuffed therein.

2. The combination with a pliant, artificial casing for receiving food products, of one or more strips extending throughout the full length thereof and cemented to the inner surface, said strips bearing marks or characters which are visible through the casing and also serving to reinforce the casing.

3. A new article of manufacture substantially transparent comprising a casing having an insert formed of paper extending longitudinally thereof and adhesively connected to the inner surface of the casing whereby when the casing is filled the strip will serve to indicate the source of manufacture of the goods placed in the casing.

4. The method of inserting a marking strip in a casing which consists in arranging the casing on a suitable guide, applying an adhesive to the strip and drawing it through the guide within the casing, and finally pressing the casing and strip together to cause the strip to adhere to the inner surface of the casing.

5. The process of applying a marking and reinforcing tape to a tubular casing formed of transparent cellulose or the like, and adapted to receive a food product which consists in applying an adhesive to the tape, then inserting the tape in the casing and pressing the same against the casing to cause the adhesive to stick the parts together.

6. The method of applying a substantially continuous marking insert having marking indicia thereon in a transparent, flexible tubular casing member which consists in drawing the end portion of said marking insert into said member, then cutting off the end portion which is in the casing and securing it to the inner wall thereof for the purposes set forth.

7. A new article of manufacture comprising a transparent casing formed of cellulosic material, having one or more identification strips of parchment paper or the like secured to the inner walls thereof and extending longitudinally of the casing, substantially the full length thereof, said strips bearing identifying markings on their outer surfaces whereby the markings will be visible through the casing, a food product stuffed in the casing, and means for securing the ends of the casing and adjacent portions of the strips to close the respective ends of the casing as herein described.

ALPHEUS J. FREEMAN.